(12) United States Patent
Li et al.

(10) Patent No.: US 8,275,887 B2
(45) Date of Patent: *Sep. 25, 2012

(54) MOBILE COMMUNICATIONS DEVICE CAPABLE OF REPLYING TO ADVERTISING MESSAGE AND METHOD THEREOF

(75) Inventors: Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 433 days.

This patent is subject to a terminal disclaimer.

(21) Appl. No.: 12/346,776

(22) Filed: Dec. 30, 2008

(65) Prior Publication Data
US 2010/0022259 A1    Jan. 28, 2010

(30) Foreign Application Priority Data
Jul. 28, 2008   (CN) .......................... 2008 1 0303128

(51) Int. Cl.
*G06F 15/173* (2006.01)
(52) U.S. Cl. ........................................ 709/226; 455/466

(58) Field of Classification Search ................. 709/226; 455/466
See application file for complete search history.

(56) References Cited

U.S. PATENT DOCUMENTS

| 7,089,024 B2 * | 8/2006 | Kim et al. ...................... 455/466 |
| 2008/0097836 A1 * | 4/2008 | Silanto et al. .................... 705/14 |
| 2008/0101370 A1 * | 5/2008 | Marsico et al. ................ 370/392 |
| 2008/0147493 A1 * | 6/2008 | Aarnio et al. .................... 705/14 |
| 2008/0305815 A1 * | 12/2008 | McDonough ................. 455/466 |
| 2009/0176518 A1 * | 7/2009 | Doni ............................. 455/466 |
| 2009/0203359 A1 * | 8/2009 | Makhoul et al. ........... 455/412.2 |

FOREIGN PATENT DOCUMENTS

CN    101043674 A    9/2007

* cited by examiner

*Primary Examiner* — Thomas Dailey
(74) *Attorney, Agent, or Firm* — Altis Law Group, Inc.

(57) ABSTRACT

A mobile communications device capable of replying to advertising message (ad) quickly and a method thereof are provided. The method includes steps of: receiving an ad transmitted by a server; identifying whether the received ad is a message in a predetermined format; reading a decoding program from a storage unit to decode the received ad if the received ad is messages in the predetermined format; displaying a basic content part and a reply content part after the ad is decoded; receiving a user's reply, generating a reply message includes a reply code corresponding to the user's reply, and sending the reply message.

9 Claims, 9 Drawing Sheets

| The Basic Content Part | |
|---|---|
| Calling Number | ……………………… |
| Advertising Title | ……………………… |
| Advertising Content | ……………………… |
| The Reply Content Part | |
| Input 11 | By………… |
| Input 12 | By………… |
| Input 13 | By………… |
| . | ………….……… |
| . | ………....……… |
| . | ……….:……… |
| The feedback Content Part | |
| Choose 11 | You have …… |
| Choose 12 | You have …… |
| . | ……………………… |
| . | ……………………… |
| . | ……………………… |

FIG. 2

| The Basic Content Part ||
|---|---|
| Calling Number | 10086 |
| Advertising Title | Present mobile fee |
| Advertising Content | Hello! customer…… |
| The Reply Content Part ||
| Input 11 | Yes, I want to take part in |
| Input 12 | Yes, I want to custom… |
| Input 13 | Yes, I want to custom… |
| . . | ……………… ……………… |
| The feedback Content Part ||
| Choose 11 | You have chosen to take part in the activity |
| Choose 12 | You have……… |
| . . | ………………………… ………………………… |

FIG. 3

The basic content part#
BNum········Enum---
BTitle········ETitle---
BText········EText---
The reply content part#
Rtype11  Rcont············---
Rtype12  Rcont············---.

The feedback content part#
Ftype11  Fcont············---
Ftype12  Fcont············---..

FIG. 4

10086
Present mobile fee
Hello! customer
,china mobile have made an
activity………

………………

Input 11： Yes, I want to
take part in the activity
Input 12： Yes, I want to
custom……
Input 13： Yes, I want to
custom……
. ……
. ……

FIG. 7

10086
Present mobile fee
Hello! customer
,china mobile have made an
activity………
………………

Input 11： Yes, I want to take part in the activity
Input 12： Yes, I want to custom……
Input 13： Yes, I want to custom……
.　　……
.　　……

You have chosen to take part in the activity

FIG. 8

MOBILE COMMUNICATIONS DEVICE CAPABLE OF REPLYING TO ADVERTISING MESSAGE AND METHOD THEREOF

BACKGROUND

1. Technical Field

The present disclosure relates to a mobile communications device able to reply to advertising messages and method thereof.

2. Description of Related Art

In general, the content of an advertising message includes two parts: a basic content part and a reply content part. The basic content part provides the ad message. The reply content part provides one or more replies a user may choose from, and each of the replies is assigned a reply code.

Corresponding to the replies of the ad includes some processing steps. In general, the mobile communications device first provides a reply option for the user to reply to the ad, then provides an editing interface for the user to edit the reply after the user chooses the reply option, and sends out the reply after the user has finished editing the reply. The above reply manner is complex and inconvenient for the user, and wastes resources of the server when feedback is sent in response to the reply.

Therefore, what is needed is a mobile communications device and method which can reply to ads efficiently.

BRIEF DESCRIPTION OF THE DRAWINGS

FIG. 2 is a exemplary table of the server 10 for associating content with three parts of an ad in accordance with an exemplary embodiment.

FIG. 3 is a schematic diagram showing an ad encoding program.

FIG. 4 illustrates an ad in a predetermined format in accordance with an exemplary embodiment.

FIG. 7 is a schematic diagram showing an ad received by and displayed on the mobile communication device of FIG. 1 or FIG. 2, in accordance with an embodiment.

FIG. 8 is a schematic diagram showing the ad of FIG. 7 with feedback content, in accordance with an embodiment.

DETAILED DESCRIPTION OF THE EMBODIMENTS

Figure 1:
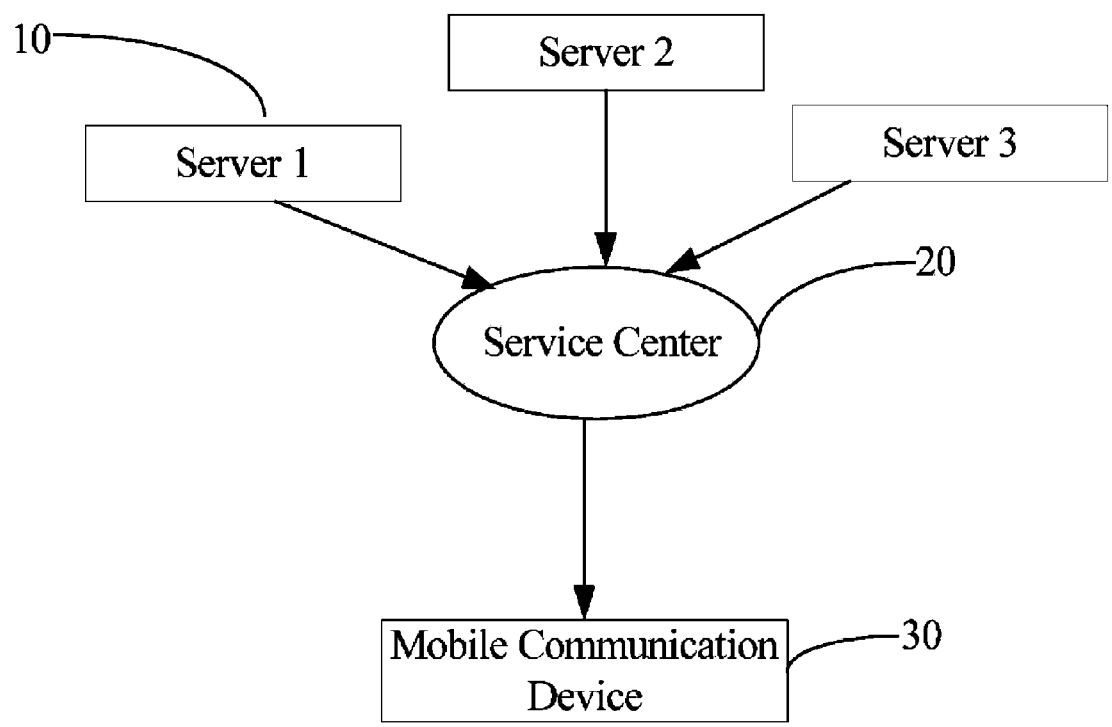
FIG. 1 is a schematic diagram of a system, including a communications device, for receiving and sending ads in accordance with an exemplary embodiment.

FIG. 1 is a schematic diagram of a system, including a communications device, for receiving and sending ads in accordance with an exemplary embodiment. The system includes at least one server 10, a service center 20, and at least one mobile communications device 30. The server 10 is configured to generate the ads according to an encoding format such as that shown in FIG. 4, and send the ads in a predetermined format to the mobile communications device 30 through the service center 20. Wherein the service center 20 can be Short Messaging Service (SMS), Multimedia Messaging Services (MMS), Enhanced Message Service (EMS), and so on. The mobile communications device 30 decodes the ads with the predetermined format according to a decoding program.

FIGS. 2 and 3 are exemplary tables of the server 10 for associating content with three parts of an ad in accordance with an exemplary embodiment. The ad in the predetermined format includes three parts: a basic content part, a reply content part, and a feedback content part. The basic content part is basic information the sender wants to display by the receiving mobile communication device 30, such as, but not limited to, the calling number of the server 10, the ad title, and the ad content. The reply content part includes a plurality of replies for the user to choose from, each reply is encoded and assigned a reply code for easy identification by the server 10. The feedback content part of the ad is invisible for the user before the user replies the ad, otherwise, the feedback content part of the ad is visible after the user replies the ad. With the reply content part, specific input by a user is associated with various reply choices offered to the user. For example, a user may see on the display "to say yes, enter 11 or touch here". The feedback content part provides feedback content in response to the chosen reply code, such as a message to the user that their reply has been sent. For better understanding the ad, an exemplary ad is illustrated in FIG. 3. Basic information provided by the basic content part of the ad may be as follows: the calling number is "10086," the advertising title is "present mobile fee," the advertising content is "Hello, customer . . . ;" replies provided in the reply content part of the ad may be: "Yes, I want to participate" if the user inputs "11," "Yes, I want to custom . . . " if the user inputs "12," "Yes, I want to custom . . . " if the user inputs "13" and so on; feedback contents provided in the feedback content part of the ad may be: "You have chosen to take part in the activity" if the chosen reply code is "11" "You have . . . " if the chosen reply code is "12," "You have . . . " if the chosen reply code is "13," and so on.

FIG. 4 is a schematic diagram showing an ad encoding format in an exemplary embodiment. The encoding format defines an encoding rule and a plurality of encoding identifiers. The encoding rule defines an encoding order of the three parts of the ad (i.e., the basic content part, the reply content part, and the feedback content part). For example, in the exemplary embodiment, the encoding order of the three parts is: first, encoding the basic content part, second, encoding the reply content part, and last, encoding the feedback content part. The encoding order further defines a sub encoding order for each part. For example, in the exemplary embodiment, the sub encoding order for the basic content part is, first, encoding the calling number, second, encoding the title, and last, encoding the text.

The encoding identifier is configured to identify the three parts of the ad. That is, each part is assigned two identifiers, for example, "#," and "_" Based on the encoding order and the identifiers, each part of the ad can be identified. For example, in the exemplary embodiment, when the first two identifiers are identified, the basic content part is identified; when the second two identifiers are identified, the reply content part is identified; and when the third two identifiers are identified, the feedback content part is identified.

Furthermore, the encoding format further defines a plurality of sub encoding identifiers to identify the content of each part. For example, in the exemplary embodiment, each part of the basic content part are assigned a first sub identifier for indicating the beginning of the corresponding part and a second sub identifier for indicating the ending of the corresponding part. The first sub identifier as well as the second sub identifier can be in a form of a particular character combined with an abbreviation of the part. For example, the first sub identifier of the calling number can be in the form of "BNum", and the second sub identifier of the calling number can be in the form of "ENum". Detailed description of the sub identifiers of the content of the three parts are shown in FIG. 4.

In another exemplary embodiment, the ad can just include the basic content part and the reply content part, without the feedback content part. Contents of the basic content part and the reply content part are the same as that in the exemplary embodiment described above, so detailed description thereof is omitted.

Figure 5:
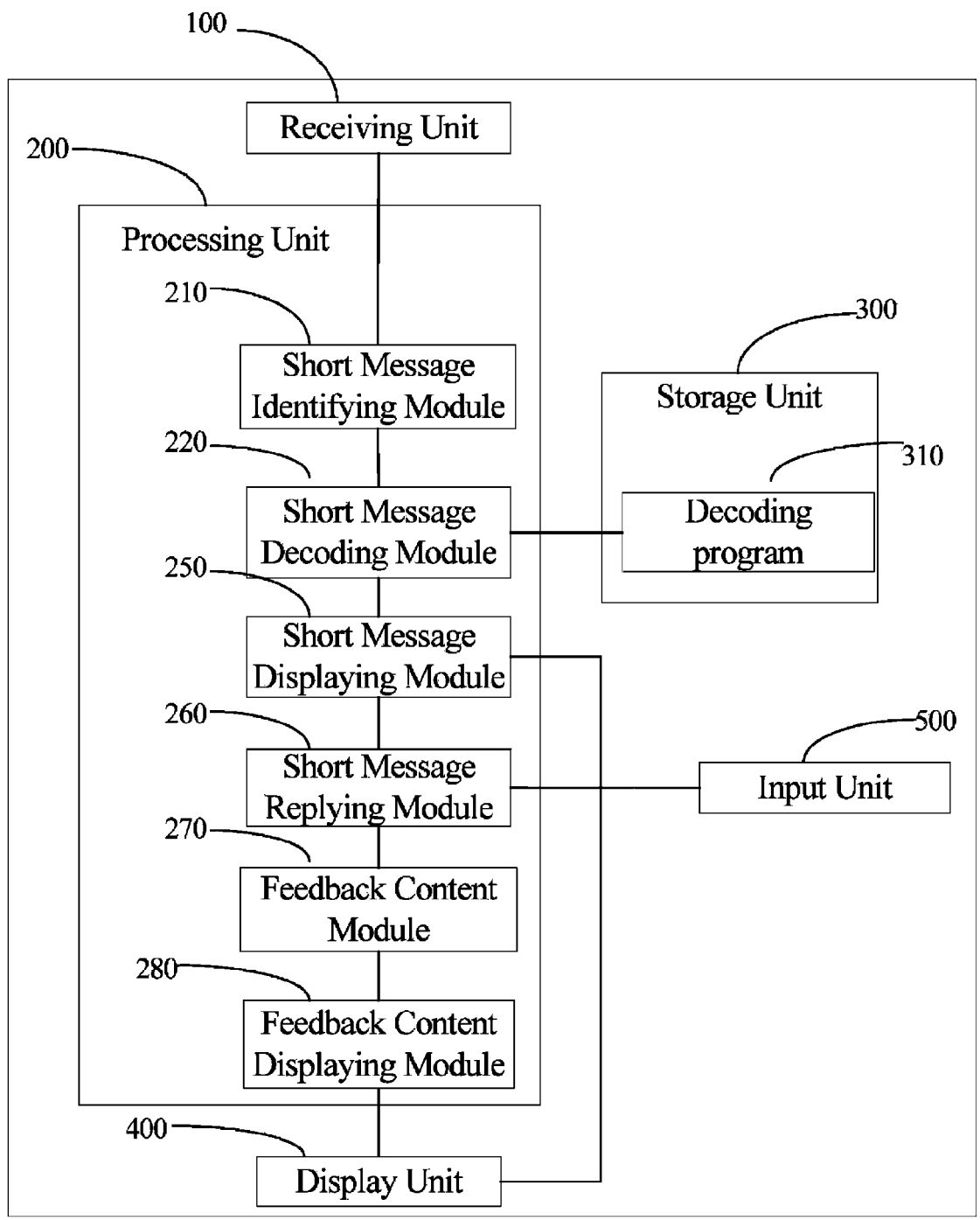
FIG. 5 is a block diagram of a hardware infrastructure of the mobile communications device of FIG. 1 in accordance with an exemplary embodiment.

FIG. 5 is a block diagram of a hardware infrastructure of the mobile communications device of FIG. 1 in accordance with an exemplary embodiment. The mobile communications device 30 includes a receiving unit 100, a processing unit 200, a storage unit 300, a display unit 400, and an input unit 500. The storage unit 300 is configured to store a decoding program 310. The decoding program 310 is configured to decode the ad in a predetermined format. The receiving unit 100 is configured to receive the ad from the server 10, and store the ad in the storage unit 300 via the processing unit 200. In general, the received ad is either in a general format or in a predetermined format. If the received ad is in the general format, the processing unit 200 processes the ad with a general manner. In the exemplary embodiment, the general manner includes, but is not limited to, deleting message, replying message, forwarding message, and so on. The input unit 500 is configured to input the reply code according to the reply content part of the ad. The input unit 500 can be a keyboard, a touch screen, or a combination of a keyboard and a touch screen.

The processing unit 200 includes a short message identifying module 210, a short message decoding module 220, a short message displaying module 250, a short message replying module 260, a feedback content module 270, and a feedback content displaying module 280.

The short message identifying module 210 is configured to identify whether the received ad is a message in the predetermined format. For example, in the exemplary embodiment, the server 10 sets a special suffix name for the ad in the predetermined format, the short message identifying module 210 identifies whether the suffix name of the received ad is consistent with the special suffix name set by the server 10. If the suffix name of the received ad is consistent with the special suffix name set by the server, the short message identifying module 210 determines that the received ad is the ad in the predetermined format.

In another exemplary embodiment, the server 10 sets a special header identifier for the ad in the predetermined format, the short message identifying module 210 identifies whether the header identifier of the received ad is consistent with the special header identifier set by the server. If the header identifier of the received ad is consistent with the special header identifier that the server 10 sets, the short message identifying module 210 determines that the received ad is the ad in the predetermined format.

The short message decoding module 220 is configured to invoke the decoding program 310 from the storage unit 300, and identify each part of the ad in the predetermined format according to the decoding program 310. The short message displaying module 250 is configured to display the basic content part and the reply content part after the short message decoding module 220 decodes the ad as shown in FIG. 7. The short message replying module 260 is configured to receive a user's reply from the input unit 500, generate a reply message which includes the reply code corresponding to the user's reply, and send the reply message to the server 10.

Corresponding to each of the replies for the user to choose from, the mobile communications device 30 provides two reply manners to reply the ad. Each of the reply manners defines processing steps to reply the ad by the user. For example, regarding the first reply manner, the mobile communications device 30 first provides a reply option for the user to reply to the ad, then provides an editing interface for the user to edit the reply after the user chooses the reply option, and sends the reply to the server 10 when the user finishes editing the reply. Regarding the second reply manner, the mobile communications device 30 automatically generates a reply message in response to the reply code input by the user, and sends the generated reply message to the server 10.

The feedback content module 270 is configured to identify the chosen reply code, and activate the feedback content associated with the chosen reply code, thereafter the feedback content is visible for the user. For example, in the exemplary embodiment, the feedback content module 270 activates a feedback content "You have chosen to take part in the activity" if the chosen reply code is "11".

The feedback content displaying module 280 is configured to display the activated feedback content on the display unit 400 as shown in FIG. 8. The feedback content displaying module 280 can only display the feedback content part on the display unit 400. Simultaneously, in order to prompt the user for the displayed feedback content part, the feedback content displaying module 280 displays the feedback content part in a predetermined displaying mode. The predetermined displaying mode is different form the displaying mode of the basic content part and the reply content part.

Figure 6:
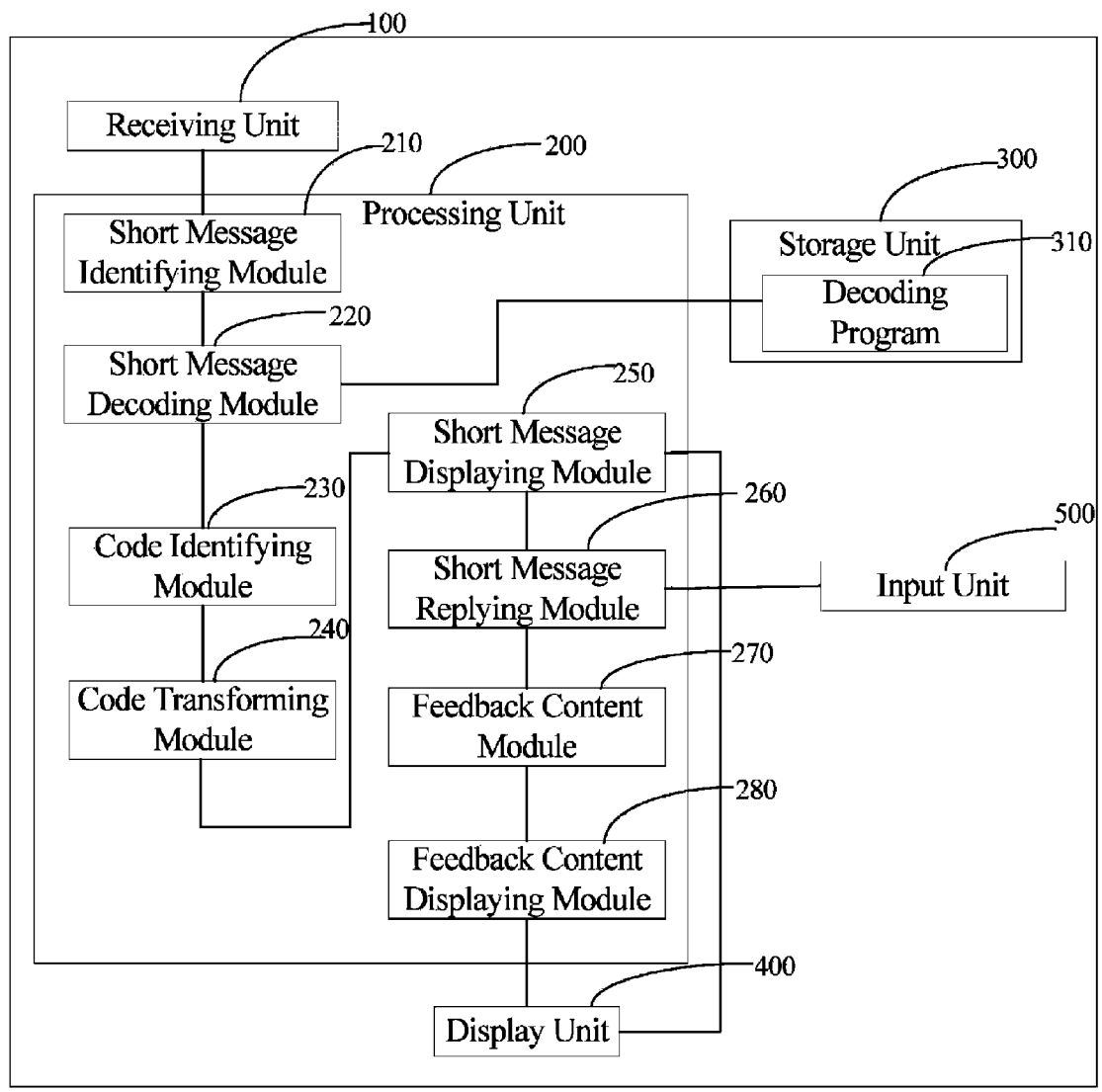
FIG. 6 is another block diagram of a hardware infrastructure of the mobile communication device of FIG. 1 in accordance with an exemplary embodiment.

In another exemplary embodiment as shown in FIG. 6, the processing unit 200 further includes a code identifying module 230 and a code transforming module 240. The code identifying module 230 is configured to identify whether the reply code is a complex reply code. In the exemplary embodiment, the complex reply code is one whose byte length is greater than a predetermined byte length.

The code transforming module 240 is configured to transform the complex reply code to a predetermined simple user input code. For example, if the reply code of the ad is "abcdeuf," "dabudcf," or "poldenv," the code identifying module 230 identifies this reply code as a complex reply code, the code transforming module 240 transforms the complex reply code into a predetermined simple user input code, e.g., "11", "22," or "33," respectively. The short message displaying module 250 displays the predetermined simple user input code in the reply content part of the ad after the code transforming module 240 transforms the complex reply code to the predetermined simple user input code. Accordingly, it is easy and convenient for the user to reply to the ad according to the predetermined simple user input code The code transforming module 240 further transforms the reply code to the corresponding complex reply code, and the short message replying module 260 sends the corresponding complex reply code to the server 10, after the user selects a reply to the ad. Wherein the reply code is the predetermined simple user input transformed form the corresponding complex reply code by the code transforming module 240.

The feedback content module 270 is configured to identify the chosen reply code, and activate the feedback content associated with the chosen reply code, thereafter the feedback content is visible for the user Wherein the identified chosen reply code is either input by the user or output by the code transforming module 240. The feedback content displaying module 280 is configured to display the activated feedback content on the display unit 400.

Figure 9:
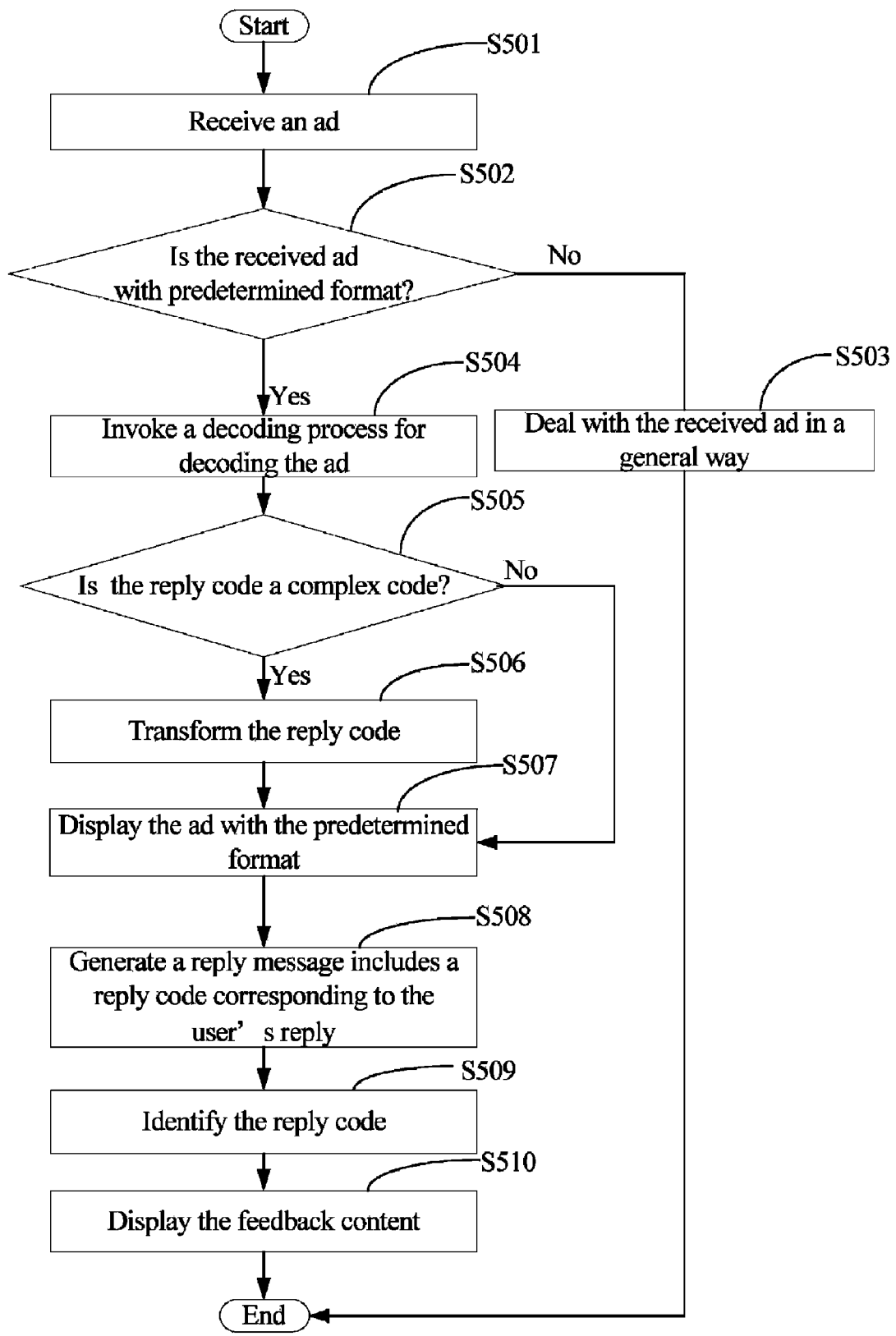
FIG. 9 is a flowchart of an ad reply method implemented by the mobile communications device of FIG. 6 in accordance with an exemplary embodiment.

FIG. 9 is a flowchart of an ad reply method implemented by the mobile communications device of FIG. 6 in accordance with an exemplary embodiment.

In step S501, the receiving unit 100 receives the ad transmitted by the server 10.

In step S502, the short message identifying module 210 identifies whether the received ad is the message in the predetermined format.

In step S503, the user deals with the ad in a general manner if the received ad is in the general format.

In step S504, the short message decoding module 220 invokes the decoding program 310 from the storage unit 300 for decoding the ad if the ad is the message in the predetermined format.

In step S505, the code identifying module 230 identifies whether the reply code of the ad is a complex reply code. That is, the code identifying module 230 determines whether the byte length of the reply code is greater than a predetermined byte length. If the reply code is not the complex reply code, the procedure goes to step S507.

If the reply code is the complex reply code, in step S506, the code transforming module 240 transforms the complex reply code into the predetermined simple user input code.

In step S507, the short message displaying module 250 displays the basic content part and the reply content part of the ad on the display unit 400.

In step S508, the short message replying module 260 receives a user's reply, generates a reply message which includes the reply code corresponding to the user's reply, and sends the reply message to the server 10.

In step S509, the feedback content module 270 identifies the chosen reply code, and activate the feedback content associated with the chosen reply code, thereafter the feedback content is visible for the user.

In step S510, the feedback content displaying module 280 displays the activated feedback content on the display unit 400.

Although the present invention has been specifically described on the basis of the exemplary embodiment thereof, the invention is not to be construed as being limited thereto. Various changes or modifications may be made to the embodiment without departing from the scope and spirit of the invention.

What is claimed is:

1. A mobile communications device capable for replying to an advertising message (ad), comprising:
   a receiving unit capable of receiving the ad from a server, wherein the received ad is either in a general format or in a predetermined format, wherein the ad in the predetermined format comprises a basic content part and a reply content part, the reply content part includes a plurality of replies for a user to choose from, each reply is encoded and assigned a reply code for the user to input to reply the ad, and each part of the ad is assigned with an identifier for identification;
   a storage unit capable of storing the received ad and a decoding program for decoding the ad according to the decoding program;
   a display unit;
   an input unit; and
   a processing unit comprising:
      a short message identifying module capable of identifying whether the received ad is a message in the predetermined format;
      a short message decoding module capable of invoking the decoding program from the storage unit for decoding the ad, and identifying the assigned identifiers of the ad to retrieve each part of the ad in the predetermined format;
      a short message displaying module capable of displaying the basic content part and the reply content part in a displaying mode on the display unit after the short message decoding module decodes the ad; and
      a short message replying module capable of receiving the reply code from the input unit, generating a reply message which includes the received reply code, and sending the reply message;
      a code identifying module capable of comparing a byte length of the reply code with a predetermined byte length to identify whether the reply code is in a complex reply code type, wherein the reply code in the complex code type is one whose byte length is greater than the predetermined byte length; and
      a code transforming module capable of transforming the reply code in the complex reply code type into only one reply code in a predetermined simple reply code type whose byte length is less than the predetermined byte length and which is different from any part of the reply code in the complex reply code type, and further capable of transforming the only one reply code in the predetermined simple reply code type into the corresponding reply code in the complex reply code type after the user inputs the reply code in the predetermined simple reply code type for the ad.

2. The mobile communications device as in claim 1, wherein the input unit is selected from the group consisting of a keyboard, a touch screen, and a combination of a keyboard and a touch screen.

3. The mobile communications device as in claim 1, wherein the ad further comprises a feedback content part which defines feedback content corresponding to the chosen reply code; the processing unit further comprises:
   a feedback content module capable of identifying a chosen reply code, and activate the feedback content associated with the chosen reply code, thereafter the feedback content is visible for the user; and
   a feedback content displaying module capable of displaying the activated feedback content part on the display unit.

4. The mobile communications device as in claim 3, wherein the feedback content displaying module displays the feedback content part in a predetermined displaying mode, and the predetermined displaying mode is different from the displaying mode of the basic content part and the reply content part.

5. An advertising message (ad) replying method comprising:
   receiving the ad from a server, wherein the received ad is either in a general format or in a predetermined format, and the ad in the predetermined format comprises a basic content part and a reply content part, the reply content part comprises a plurality of replies for a user to choose from, each reply is encoded and assigned a reply code for the user to input to reply the ad, and each part of the ad is assigned with an identifier for identification;
   identifying whether the received ad is a message in the predetermined format;
   decoding the ad via a decoding program, and identifying the assigned identifiers of the ad to retrieve each part of the ad in the predetermined format;

displaying the basic content part and the reply content part in a displaying mode; and receiving the reply code from an input unit, and generating a reply message which includes the received reply code, and sending the reply message;

comparing a byte length of the reply code with a predetermined byte length to identify whether the reply code is in a complex reply code type, wherein the reply code in the complex code type is one whose byte length is greater than the predetermined byte length; and transforming the reply code in the complex reply code type into only one reply code in a predetermined simple reply code type whose byte length is less than the predetermined byte length and which is different from any part of the reply code in the complex reply code type, and transforming the only one reply code in the predetermined simple reply code type into the corresponding reply code in the complex reply code type after the user inputs the reply code in the predetermined simple reply code type for the ad.

6. The method as described in claim 5, further comprising: providing an input device for receiving the user's reply.

7. The method as described in claim 5, further comprising identifying the chosen reply code and activating the feedback content associated with the chosen reply code, thereafter the feedback content is visible for the user; and displaying the activated feedback content part.

8. The method as described in claim 7, further comprising: displaying the feedback content part in a predetermined displaying mode, wherein the predetermined displaying mode is different from the displaying mode of the basic content part and the reply content part.

9. The method as described in claim 5, further comprising: handling the ad in a different way upon the condition that the received ad is not in the predetermined format.

\* \* \* \* \*